(12) United States Patent
Oyabe

(10) Patent No.: US 6,404,659 B1
(45) Date of Patent: Jun. 11, 2002

(54) ELECTRIC POWER CONVERSION APPARATUS

(75) Inventor: Kazunori Oyabe, Nagano (JP)

(73) Assignee: Fuji Electric Co., Ltd., Kawasaki ( * ) Notice: Subject to any disclaimer, the term of this patent is extended or adjusted under 35 U.S.C. 154(b) by 0 days.

(21) Appl. No.: 09/692,737

(22) Filed: Oct. 19, 2000

(30) Foreign Application Priority Data

Oct. 26, 1999 (JP) ............................................. 11-303248

(51) Int. Cl.⁷ ....................... H02M 7/5387; H03B 1/00; H02P 1/40
(52) U.S. Cl. ......................... 363/132; 327/108; 318/811
(58) Field of Search ............................ 363/132, 89, 37, 363/40, 41, 56, 50; 327/387, 108, 176, 380; 307/353, 571; 318/811, 801, 803; 257/347

(56) References Cited

U.S. PATENT DOCUMENTS

| | | | |
|---|---|---|---|
| 5,543,994 A | 8/1996 | Wilhelm et al. | 361/18 |
| 5,767,562 A | * 6/1998 | Yamashita | 257/500 |
| 6,005,366 A | * 12/1999 | Majumdar et al. | 318/811 |
| 6,211,706 B1 | * 4/2001 | Choi et al. | 327/108 |

* cited by examiner

Primary Examiner—Rajnikant B. Patel
(74) Attorney, Agent, or Firm—Greer, Burns & Crain, Ltd.

(57) ABSTRACT

When an alarm signal provided by an inverter forming an I/F provided for the circuit on the high side enters an active (L) state, the output of the inverter indicates an H state. Then, the N-channel MOS type FET enters an ON state. At this time, the N-channel MOS type FET is connected to the I/F on the low side using a diode. Therefore, when the diode enters a normal bias state, that is, when the reference potential of the above mentioned two I/Fs approach each other, an electric current flows from the power supply to the N-channel MOS type FET through a resistor. As a result, by a voltage drop, a voltage arises in the resistor, and the output of the inverter indicates the H state. Since the output of the inverter is connected to a control unit, the control unit performs a process according to an alarm signal. Thus, the electric power conversion apparatus having a circuit on a low side for performing a switching operation based on reference potential and a circuit on a high side for performing a switching operation based on floating reference potential which is different from the reference potential by a variable amount can be smaller and less costly.

6 Claims, 12 Drawing Sheets

ELECTRIC POWER CONVERSION APPARATUS

BACKGROUND OF THE INVENTION

1. Field of the Invention

The present invention relates to an electric power conversion apparatus, and more specifically to an electric power conversion apparatus having a circuit on a low side for performing a switching operation based on reference potential, and a circuit on a circuit on a high side for performing a switching operation based on floating reference potential.

2. Description of the Related Art

FIG. 1A shows an example of an electric power conversion apparatus for converting a direct current into a three-phase alternating current in the conventional technology.

In FIG. 1A, semiconductor switches Q11 through Q13 and semiconductor switches Q21 through Q23 are configured by, for example, an IGBT (insulated gate bipolar transistor), perform a switching operation depending on the control of drive circuits 11 through 13 and drive circuits 21 through 23, convert a direct current voltage into a three-phase alternating current, and provide it for a three-phase motor 36.

With the configuration the semiconductor switches Q21 through Q23 and the drive circuits 21 through 23 perform a switching process using a ground level as reference potential. Therefore, they are referred to as a circuit on a low side circuit. On the other hand, since the semiconductor switches Q11 through Q13 and the drive circuits 11 through 13 perform a switching operation using the potential at terminal U, V, and W (fluctuating potential) as reference potential, they are referred to as a circuit on a high side. In the description below, the reference potential of the circuit on the low side is simply-called 'reference potential' while the reference potential of the circuit on the high side is called 'floating reference potential'.

A control unit 30 is configured by, for example, a CPU (central processing unit), ROM (read-only memory), RAM (random access memory), etc., controls each drive circuit through an I/F (interface) 35, and stops the operations of each drive unit when an alarm signal informing that an abnormal condition occurs is issued from each drive circuit.

The I/F 35 serves as an interface for information with the circuit on the low side and the control unit 30, and also serves as an interface for information with the circuit on the high side and the control unit 30 (described later).

FIG. 1B shows an example of a detailed configuration of the drive circuits 11 and 21 shown in FIG. 1A and the peripheral units.

As shown in FIG. 1B, the drive circuit 11 includes a power supply monitor unit 11a, an abnormal condition detection unit 11b, an I/F 11c, and a driver 11d. The drive circuit 21 is similarly configured.

The power supply monitor unit 11a determines whether or not the power supply voltage provided for the drive circuit 11 is in a normal range, and notifies the control unit 30 of the determination result through the I/F 11c if it determines an abnormal condition.

The abnormal condition detection unit 11b monitors the electric current flowing through the semiconductor switch Q11, and the temperature of the semiconductor switch Q11, and notifies the control unit 30 through the I/F 11c when an excess current flows through the semiconductor switch Q11, or when the semiconductor switch Q11 is overheating.

The I/F 11c cooperates with the I/F 35 for the consistency of physical properties so that information can be transmitted and received between the drive circuit 11 whose reference potential is not constant (that is, fluctuates depending on the status of an output) and the control unit 30 whose ground level is reference potential.

The driver 11d drives the semiconductor switch Q11 according to the control signal provided from the control unit 30 through the I/F 11c.

The drive circuit 21 has the similar configuration with the exception of a power supply monitor unit 21a. That is, since the drive circuits 11 through 13 have different reference potential, it is necessary to individually detect the power supply to be provided for each drive circuit. On the other hand, all of the drive circuits 21 through 23 have the ground level, only one power supply monitor unit has to be provided for one of the drive circuits 21 through 23. In this example, only the drive circuit 21 is provided with the power supply monitor unit 21a.

FIG. 1C shows the details of the portion for transmitting alarm signals of the I/F 11c and the I/F 35.

As shown in FIG. 1C, the portion for transmitting an alarm signal of the I/F 11c includes a P-channel MOS type FET 11ca, an inverter 11cb, and a power source 11cc. The power source 11cc is equivalent to an externally provided power source.

The portion for transmitting an alarm signal of the I/F 35 includes a power supply 35a, an inverter 35b, and a resistor 35c.

FIG. 1D shows in detail the circuit of the portion for transmitting control signals of the I/F 11c and the I/F 35.

As shown in FIG. 1D, the portion for transmitting a control signal of the drive circuit 11 includes a resistor 42 and an inverter 43. The resistor 42 is connected to the plus terminal of the I/F 11c, and the output of the inverter 43 is connected to the driver 11d.

The portion for transmitting a control signal of the I/F 35 includes an inverter 40, and an N-channel MOS type FET 41. The input of the inverter 40 is connected to the control unit 30, and the output is connected to the gate of the N-channel MOS type FET 41. The source of the N-channel MOS type FET 41 is grounded, and the drain is connected to the input terminal of the inverter 43.

Described below are the operations according to the above mentioned conventional technology. In the following explanation, the operations of the portion for transmitting the control signal shown in FIG. 1D are described first, and then the operations of the portion for transmitting the alarm signal shown in FIG. 1C are described.

First, the operation of the portion for transmitting a control signal is described below by referring to FIG. 1D.

When a control signal is issued from the control unit 30 to the inverter 40, the N-channel MOS type FET 41 enters an ON or OF state depending on the output of the inverter 40. When the output from the control unit 30 indicates the H state, the output from the inverter 40 indicates the L state, and the N-channel MOS type FET 41 enters the OFF state. If the N-channel MOS type FET 41 enters the OFF state, the input of the inverter 43 indicates the H state. Therefore, the output of the inverter 43 indicates the L state, and the driver 11d drives the semiconductor switch Q11 depending on the state and drives the semiconductor switch Q11 (for example, sets the semiconductor switch Q11 in the OFF state)

On the other hand, when the output from the control unit 30 indicates the L state, the output of the inverter 40 indicates the H state, and the N-channel MOS type FET 41 enters the ON state. When the N-channel MOS type FET 41 enters the ON state, the input of the inverter 43 indicates the L state. Therefore, the output of the inverter 43 indicates the H state, and the driver 11*d* drives the semiconductor switch Q11 depending on the state (for example, sets the semiconductor switch Q11 in the ON state).

In the above mentioned process, the semiconductor switch Q11 can be appropriately controlled. Other semiconductor switches can also be switched in the similar operations.

The circuit shown in FIG. 1D can be replaced with the circuit shown in FIG. 1E.

In this example, a source grounding circuit includes N-channel MOS type FETs 45 and 46, and load resistors 47 and 48. The output of the load resistors 47 and 48 are respectively input to the S terminal and the R terminal of a flipflop 49. The output of the flipflop 49 is input to the driver 11*d*, and an on-pulse and an off-pulse are respectively provided for the N-channel MOS type FETs 45 and 46.

When the drain potential enters the H state by the on-pulse input to the N-channel MOS type FET 45, the flipflop 49 latches it, sets the output in the H state, and resets the output in the L state depending on the off-pulse. The semiconductor switch Q11 can be driven by repeating the operations.

Then, by referring to FIG. 1C, the operations of the portion for transmitting an alarm signal are described below.

When the power supply monitor unit 11*a* or the abnormal condition detection unit 11*b* detects an abnormal condition in the power supply or the semiconductor switch Q11, then an alarm signal is set in the H state, and is input to the inverter 11*cb*.

The inverter 11*cb* inverts the state of the alarm signal, and provides it for the P-channel MOS type FET 11*ca*. Since the input alarm signal is in the H state, the output of the inverter 11*cb* is in the L state. As a result, the P-channel MOS type FET 11*ca* enters the ON state.

When the P-channel MOS type FET 11*ca* enters the ON state, an electric current flows from the power source 11*cc* to the resistor 35*c*. Therefore, a predetermined voltage is generated on either end of the resistor 35*c*.

Since the inverter 35*b* inverts the voltage generated in the resistor 35*c* and outputs it as an alarm signal, the alarm signal, which is an output of the inverter 35*b*, enters the L state when the P-channel MOS type FET 11*ca* enters the ON state.

When the alarm signal output from the inverter 35*b* enters the L state, the control unit 30 assumes that an abnormal condition occurs on the high side, and stops the operations of all drive circuits. Similar processes are performed on other drive circuits.

When an abnormal condition arises on the high side during the above mentioned processes, the operations of all drive circuits stop to prevent the semiconductor switches from being damaged.

In the above mentioned conventional technology, the reference potential of the drive circuits 11 through 13 is the potential at an output point as described above. Therefore, a voltage substantially equal to the direct current voltage to be switched can be applied to the P-channel MOS type FET 11*ca*.

As a result, it is necessary to use an element having a high withstand voltage as the P-channel MOS type FET 11*ca*. However, since a P-channel MOS type FET having a high withstand voltage is normally expensive, the production cost of an apparatus is considerably high. Furthermore, since a P-channel MOS type FET 11*ca* having a large withstand voltage is large in size, the entire apparatus can be very large.

SUMMARY OF THE INVENTION

The present invention has been developed to solve the above mentioned problems, and aims at providing an inexpensive and smaller electric power conversion apparatus.

The electric power conversion apparatus according to the present invention comprises a circuit on the low side for performing a switching operation based on the reference potential, and a circuit on the high side for performing a switching operation based on the floating reference potential. With the configuration, the difference between the reference potential and the floating reference potential fluctuates. The high side comprises a detection unit and a signal generation unit, and the low side comprises a reception unit and a control unit.

The detection unit detects the state of an operation of the circuit on the high side.

The signal generation unit generates a signal based on the detection result of the detection unit.

The reception unit receives a signal generated by the signal generation unit.

The control unit controls the above mentioned circuits on the low and high sides according to the signal received by the reception unit.

The signal generation unit and the reception unit are connected to each other using a directional element with which the connection or disconnection state is determined based on the transmission direction of a signal.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENT

The embodiments of the present invention are described below in detail by referring to the attached drawings.

To solve the above mentioned problems of the conventional technology, the present invention provides an electric power conversion apparatus comprising: a circuit on the low side for performing a switching operation based on the reference potential, and a circuit on the high side for performing a switching operation based on the floating reference potential which is different from the reference potential by a variable amount. With the configuration, the high side includes a detection unit for detecting the state of the operation of a circuit on the high side, and a signal generation unit for generating a signal based on a detection result of the detection unit. The low side includes a reception unit for receiving a signal generated by the signal generation unit, and a control unit for controlling the circuit on the low side or the high side corresponding to a signal received by the reception unit. The signal generation unit and the reception unit are connected to each other using a directional element with which the connection or disconnection state is determined based on the transmission direction of a signal.

On the high side, the detection unit detects the state of the operation of a circuit on the high side. The signal generation unit generates a signal based on a detection result of the detection unit. On the low side, the reception unit receives a signal generated by the signal generation unit. The control unit controls the circuit on the low side or the high side according to a signal received by the reception unit. The signal generation unit and the reception unit are connected to each other using a directional element with which the connection state or disconnection state is determined based on the transmission direction of a signal.

The embodiments of the present invention are described below by referring to the attached drawings.

Figure 1A:
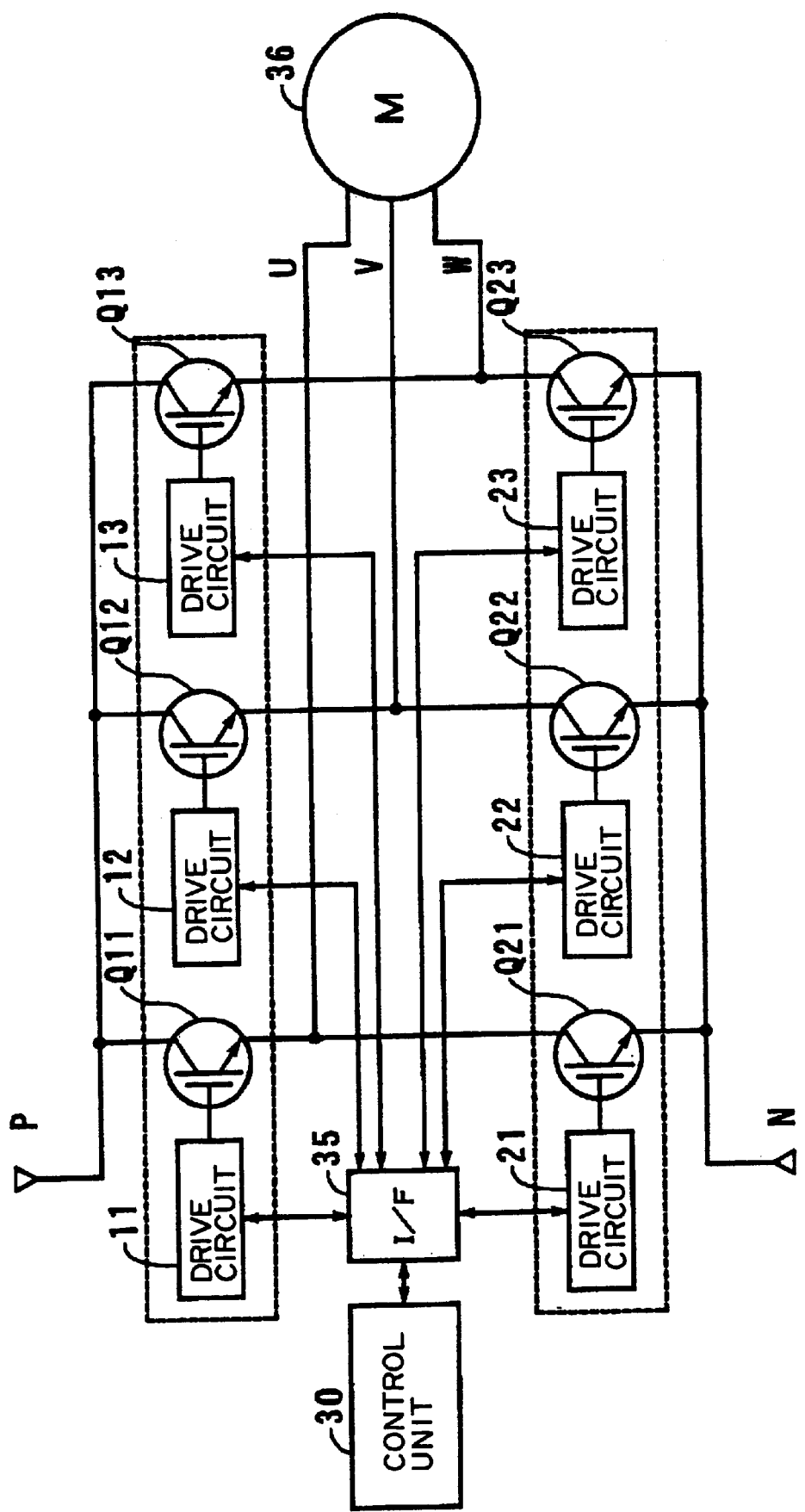
FIG. 1A shows an example of a conventional electric power conversion apparatus for converting a direct current into a three-phase alternating current.
Figure 1B:
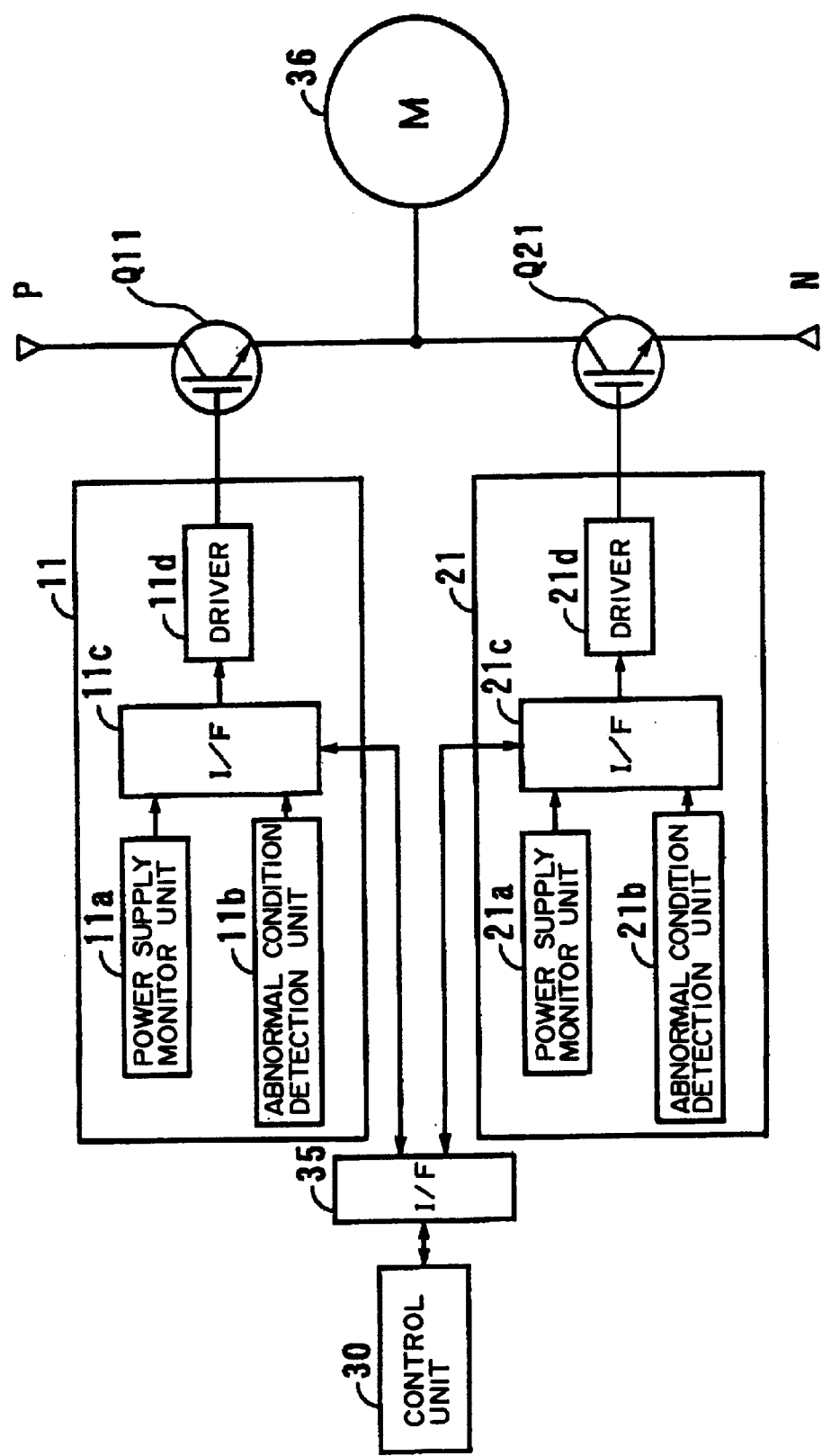
FIG. 1B is a block diagram showing an example of a detailed configuration of the drive circuits 11 and 21 shown in FIG. 1A.
Figure 1C:
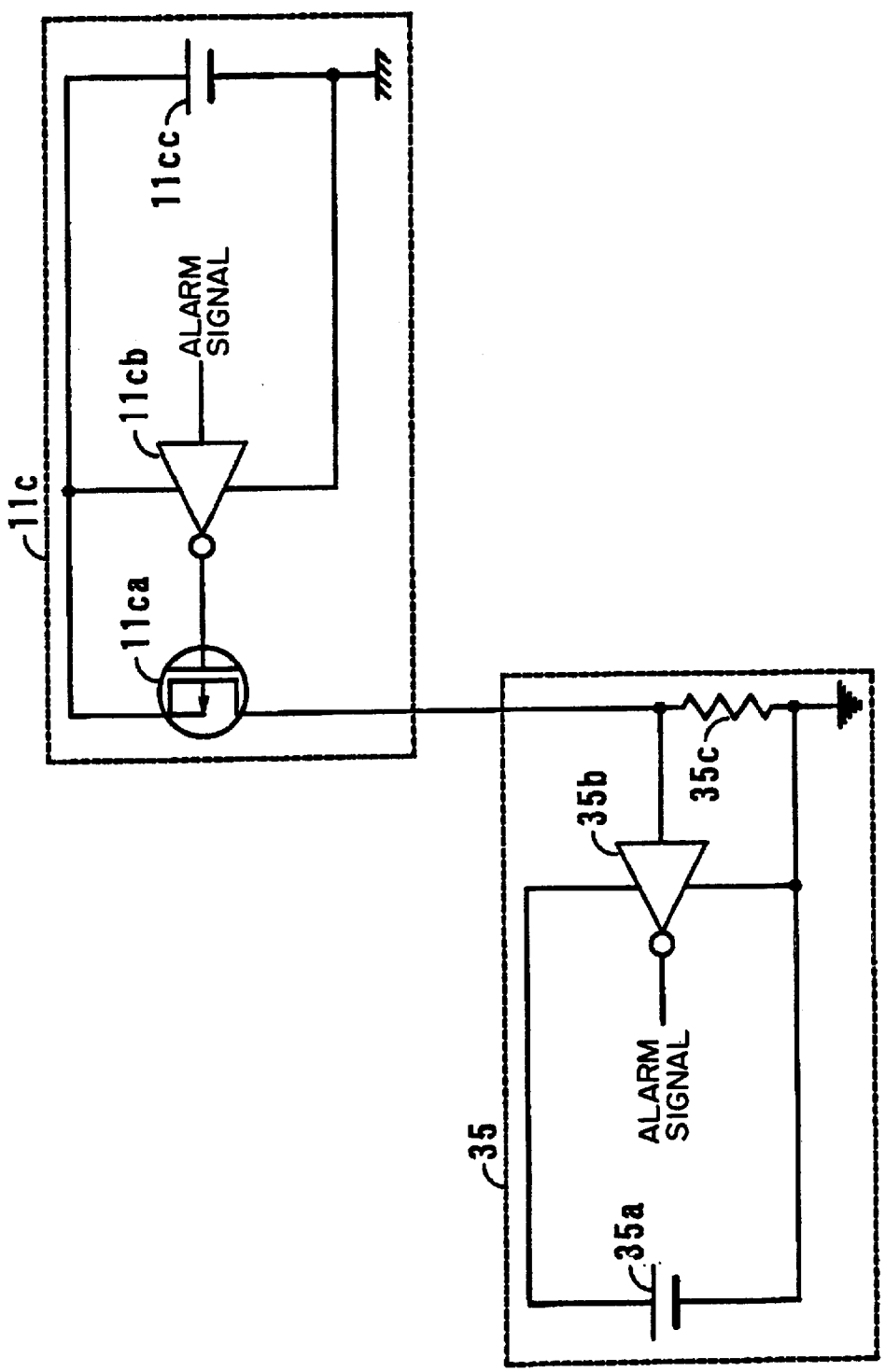
FIG. 1C shows a circuit as an example of a configuration of a portion relating to an alarm signal of the I/F 35 and the I/F 11*c* shown in FIG. 1B.
Figure 1D:
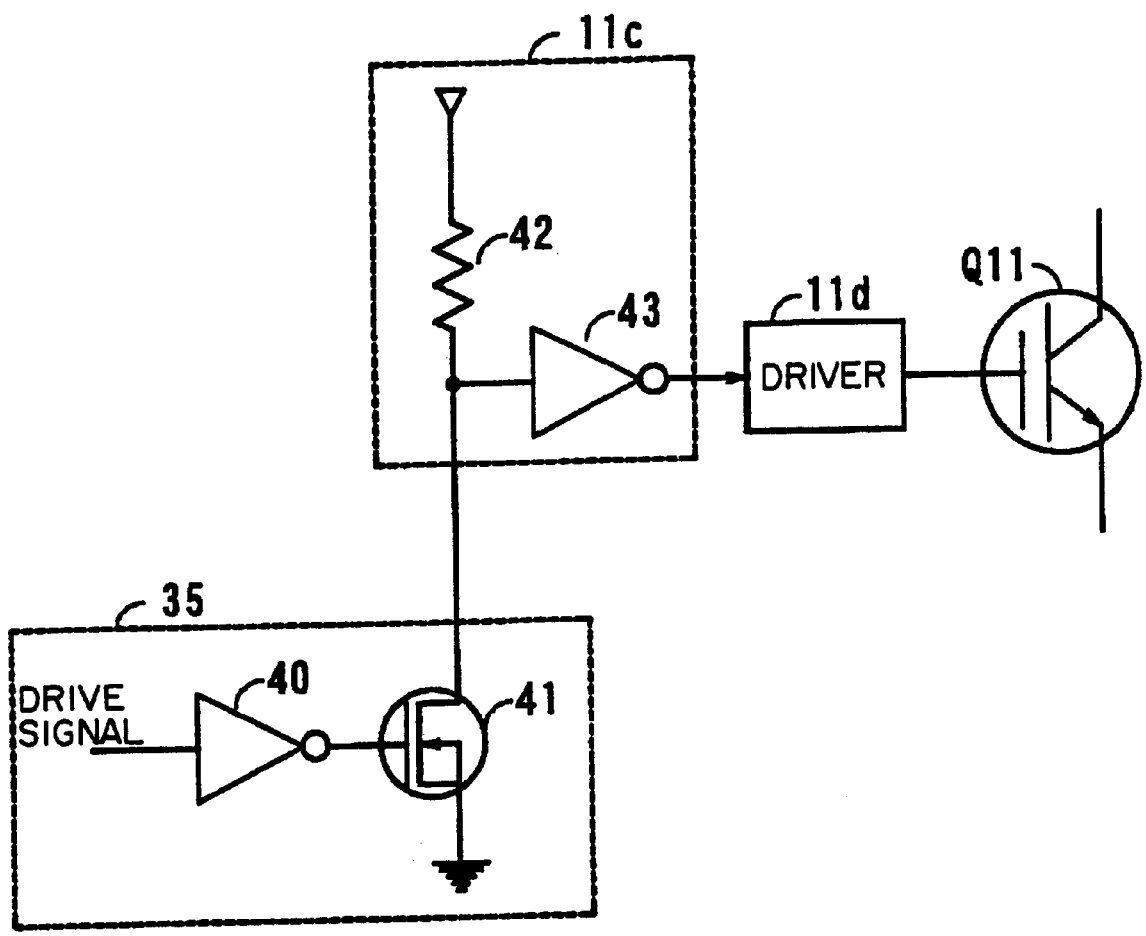
FIG. 1D shows a circuit as an example of a configuration of a portion relating to a control signal of the I/F 35 and the I/F 11*c* shown in FIG. 1B.
Figure 1E:
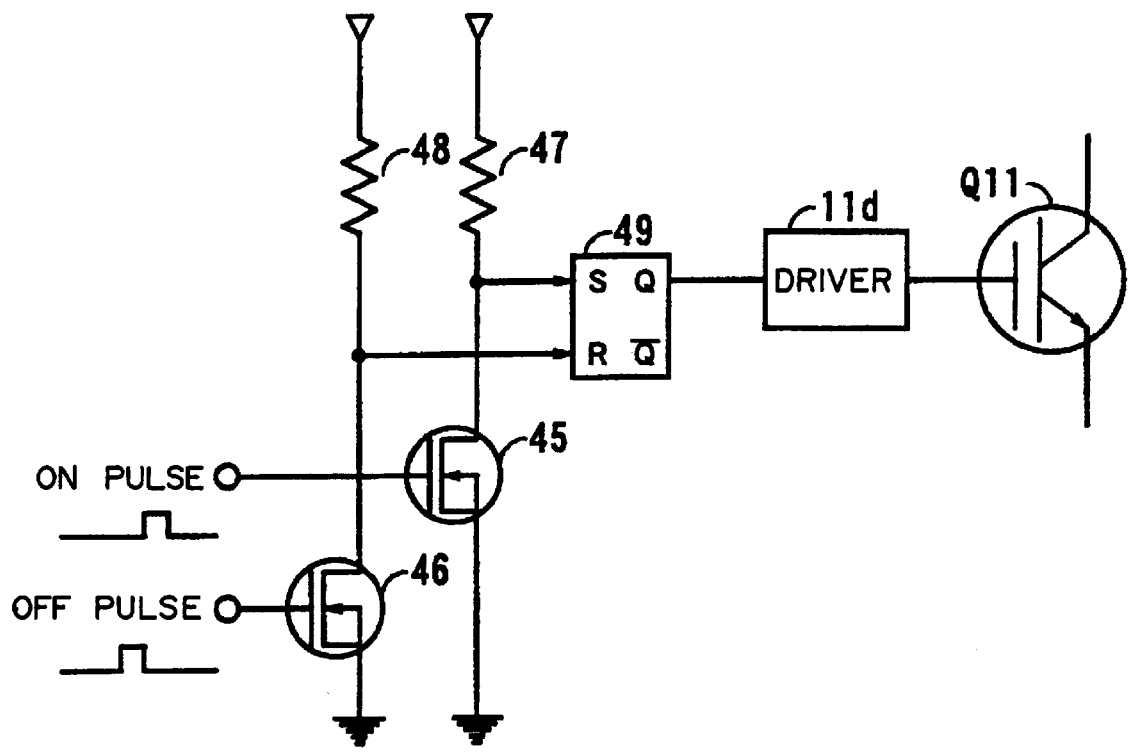
FIG. 1E shows a circuit as another example of a configuration of a portion relating to a control signal of the I/F 35 and the I/F 11*c* shown in FIG. 1B.
Figure 2A:
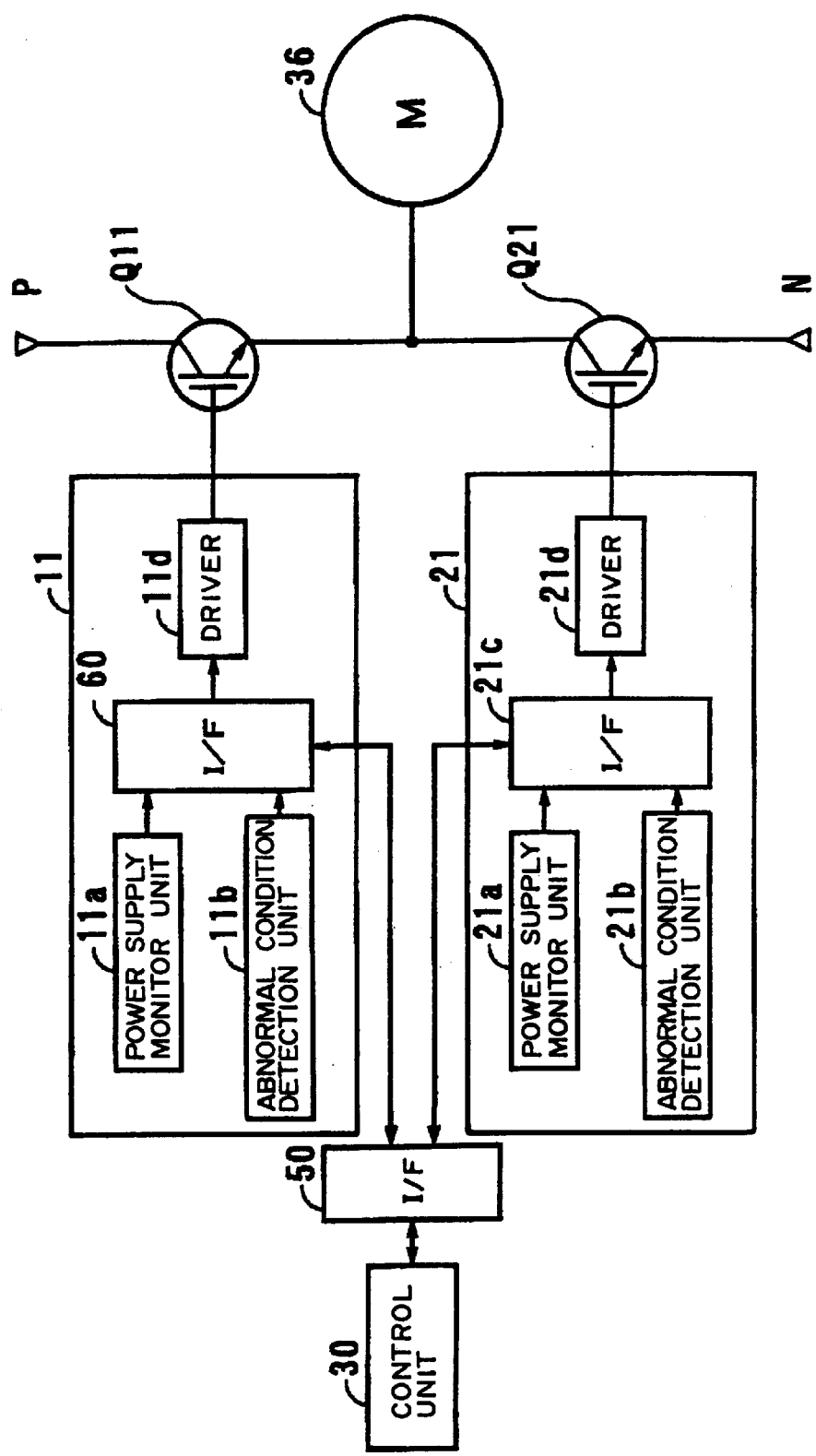
FIG. 2A is a block diagram of an example of a configuration according to the first embodiment of the present invention.

FIG. 2A shows an example of a configuration of an embodiment according to the present invention. In FIG. 2A, a unit also shown in FIG. 1B is assigned the identical unit number. Therefore, the detailed explanation is omitted here.

According to the present embodiment, as compared with the case in FIG. 1B, the I/F 11c and the I/F 35 are replaced with the I/F 60 and the I/F 50. Other units are common between the cases shown in FIGS. 1B and 2A.

Figure 2B:
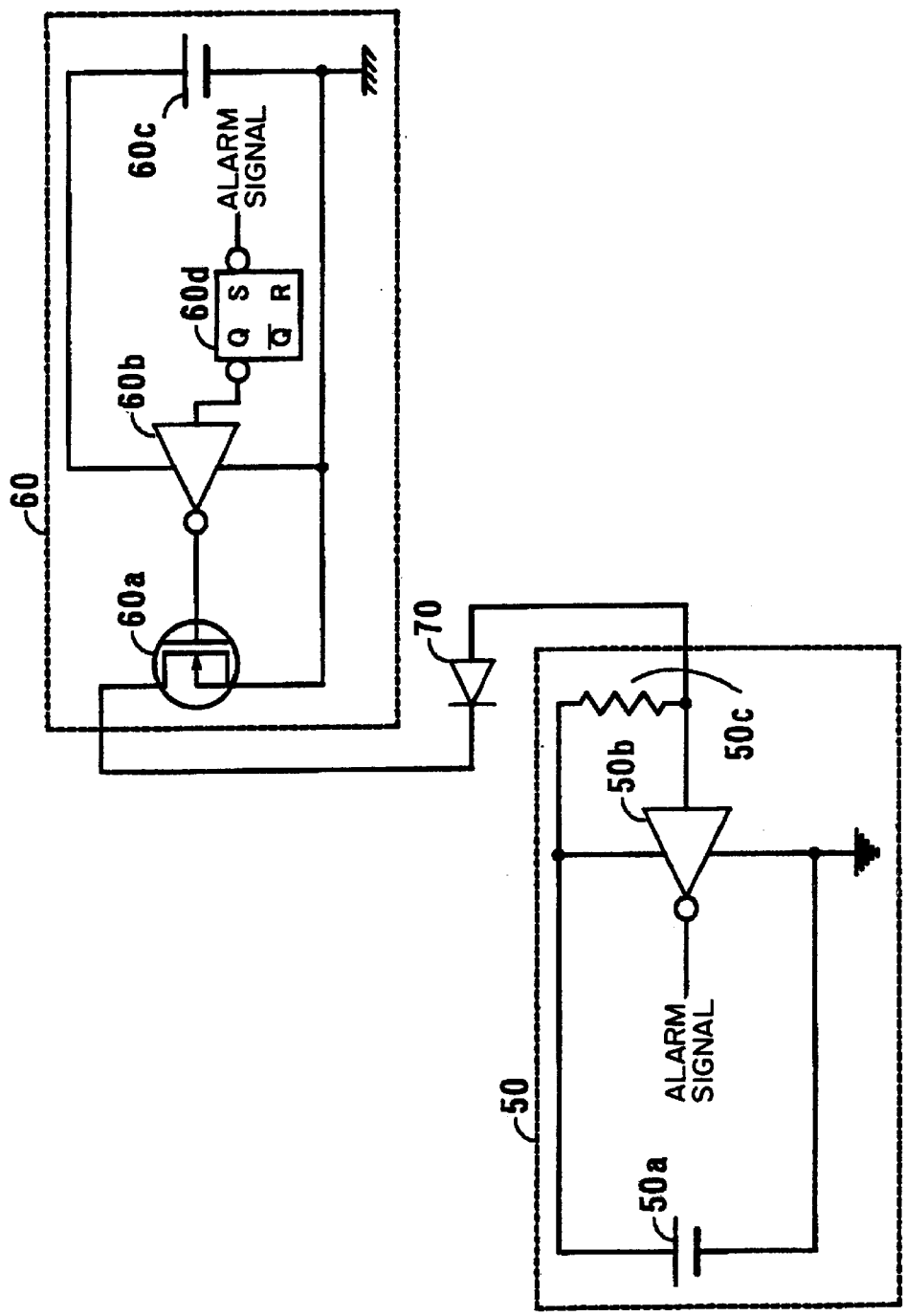
FIG. 2B shows a circuit as an example of a configuration of a portion relating to an alarm signal of an I/F 60 and an I/F 50 shown in FIG. 2A.

FIG. 2B shows the circuit of the portion for transmitting an alarm signal of the I/F 50 and the I/F 60 shown in FIG. 2A.

As shown in FIG. 2B, the I/F 60 comprises the N-channel MOS type FET 60a (signal generation unit), an inverter 60b (detection unit), a power supply 60c, and a flipflop 60d. The I/F 50 comprises a power supply 50a, an inverter 50b (reception unit), and a resistor 50c (reception unit). Furthermore, the I/F 50 and the I/F 60 are connected by the diode 70 (directional element)

The plus terminal of the power supply 60c is connected to the inverter 60b, and the minus terminal is connected to the inverter 60b, and the source of the N-channel MOS type FET 60a, and is grounded to the floating reference potential portion (for example, the ground pattern of the drive circuit 11).

The S terminal of the flipflop 60d is connected to the power supply monitor unit 11a and the abnormal condition detection unit 11b, and receives an alarm signal. The output terminal of the flipflop 60d is connected to the input terminal of the inverter 60b. The output terminal of the inverter 60b is connected to the gate of the N-channel MOS type FET 60a.

The drain of the N-channel MOS type FET 60a is connected to the cathode of the diode 70, and source is grounded to the floating reference potential portion.

The cathode of the diode 70 is connected to the drain of the N-channel MOS type FET 60a, and the anode is connected to the input terminal of the inverter 50b.

The output of the inverter 50b is provided for the control unit 30 (control unit) as an alarm signal.

The plus terminal of the power supply 50a is connected to one terminal of the inverter 50b and the resistor 50c, and the minus terminal is connected to the inverter 50b, and is connected to the reference potential portion (for example, the ground pattern of the I/F 50).

Described below is the operation of the above mentioned embodiment.

Since the I/F 50 and the I/F 60 are connected by the diode 70, the diode 70 enters an inverse bias state and a cutoff state when the potential of the drain of the N-channel MOS type FET 60a is higher than the potential of the input terminal of the inverter 50b. In this case, the potential difference between the drain of the N-channel MOS type FET 60a and the input terminal of the inverter 50b is applied to the diode 70.

On the other hand, the diode 70 enters a normal bias state and a connection state when the potential of the drain of the N-channel MOS type FET 60a is lower than the potential of the input terminal of the inverter 50b. In this state, when the power supply monitor unit 11a or the abnormal condition detection unit 11b detects an abnormal condition with the supply voltage or the semiconductor switch Q11, the alarm signal indicates the L state. When the alarm signal indicates the L state, the flipflop 60d latches the state, and provides it for the inverter 60b. Then, since the output of the inverter 60b indicates the H state, the N-channel MOS type FET 60a enters the ON state. As a result, an electric current flows from the power supply 50a to the resistor 50c, a predetermined voltage arises on either side of the resistor 50c, and the input terminal of the inverter 50b indicates the L state.

Thus, by adding the flipflop 60d, the alarm signal is latched when the potential of the drain of the N-channel MOS type FET 60a is higher than the potential of the input terminal of the inverter 50b, and the alarm signal can be transmitted when the potential of the drain of the N-channel MOS type FET 60a is lower than the potential of the input terminal of the inverter 50b.

When the input of the inverter 50b indicates the L state, the output indicates the H state. Therefore, the control unit 30 detects these states, and immediately stops the operations of the semiconductor switches Q11 through Q13 and the semiconductor switches Q21 through Q23, thereby preventing the semiconductor switches from being damaged by a short circuit, etc.

As described above, according to the embodiment of the present invention, the I/F 50 and the I/F 60 are connected by the diode 70, and an alarm signal is transmitted only when the diode 70 enters a normal bias state. Therefore, the N-channel MOS type FET 60a having a low withstand voltage can be used. Since an N-channel MOS type FET 60a is less expensive and smaller than a P-channel MOS type FET, the apparatus can be less costly and smaller.

The N-channel MOS type FET described in the above mentioned embodiment can be replaced with a P-channel MOS type FET. In this case, an element having a lower withstand voltage than in the conventional technology. Therefore, the apparatus can be smaller and less costly.

Described below is an example of a configuration according to the second embodiment of the present invention.

Figure 3:
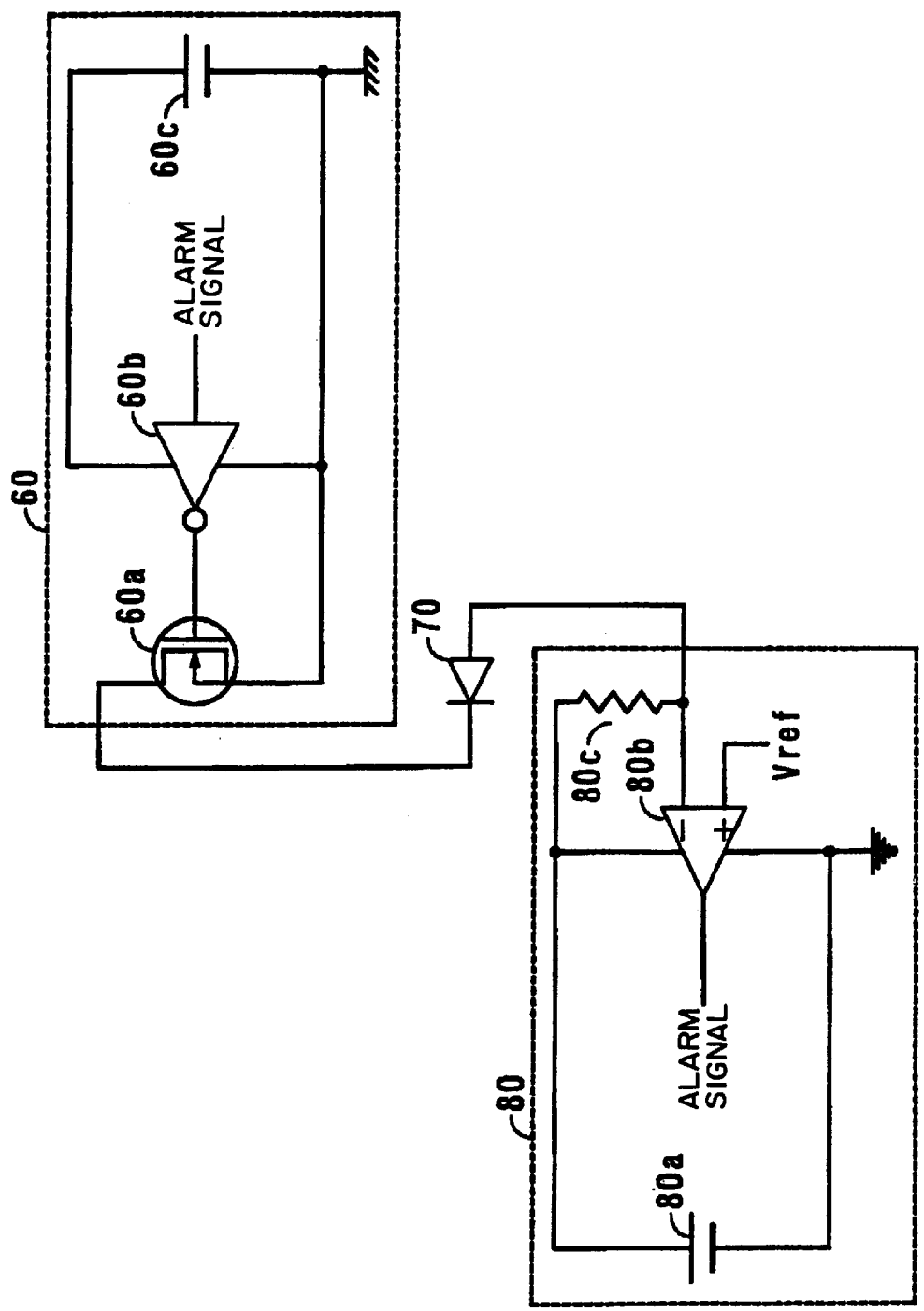
FIG. 3 shows a circuit as another example of a configuration of a portion relating to an alarm signal of an I/F 60 and an I/F 50 shown in FIG. 2A.

FIG. 3 shows the circuit as an example of the configuration according to the second embodiment of the present invention. In FIG. 3, the units also shown in FIG. 2B are assigned the identical unit numbers, and the detailed explanation is omitted here.

According to the second embodiment, as compared with the first embodiment, the I/F 50 is replaced with an I/F 80. Other units are the same as those shown in FIG. 2A.

The I/F 80 comprises a power supply 80a, a comparator 80b, and a resistor 80c. The resistor 80c and the inverted input terminal of the comparator 80b are connected to the anode of the diode 70.

A reference voltage Vref is input to the non-inverted input terminal of the comparator 80b.

The plus terminal of the power supply 80a is connected to one terminal of the comparator 80b and the resistor 80c, and the minus terminal is connected to the comparator 80b and the reference potential portion.

Other units in the configuration are the same as those shown in FIG. 2B.

Described below are the operations according to the above mentioned embodiments. Since the outline of the operations are similar to those shown in FIG. 2B, only the portions different from those shown in FIG. 2B are described below.

If the N-channel MOS type FET 60a enters the ON state when the diode 70 enters a normal bias state, an electric current flows from the power supply 80a to the resistor 80c, thereby dropping the voltage and the potential at the inverted input terminal of the comparator 80b.

If the potential of the inverted input terminal drops and becomes lower than the reference voltage Vref, then the alarm signal output from the comparator 80b indicates the H state, and the control unit 30 detects the state, and stops the operation of the drive circuit.

As described above, according to the second embodiment of the present invention, the apparatus can be smaller and less costly as in the first embodiment.

Described below is the third embodiment of the present invention.

Figure 4:
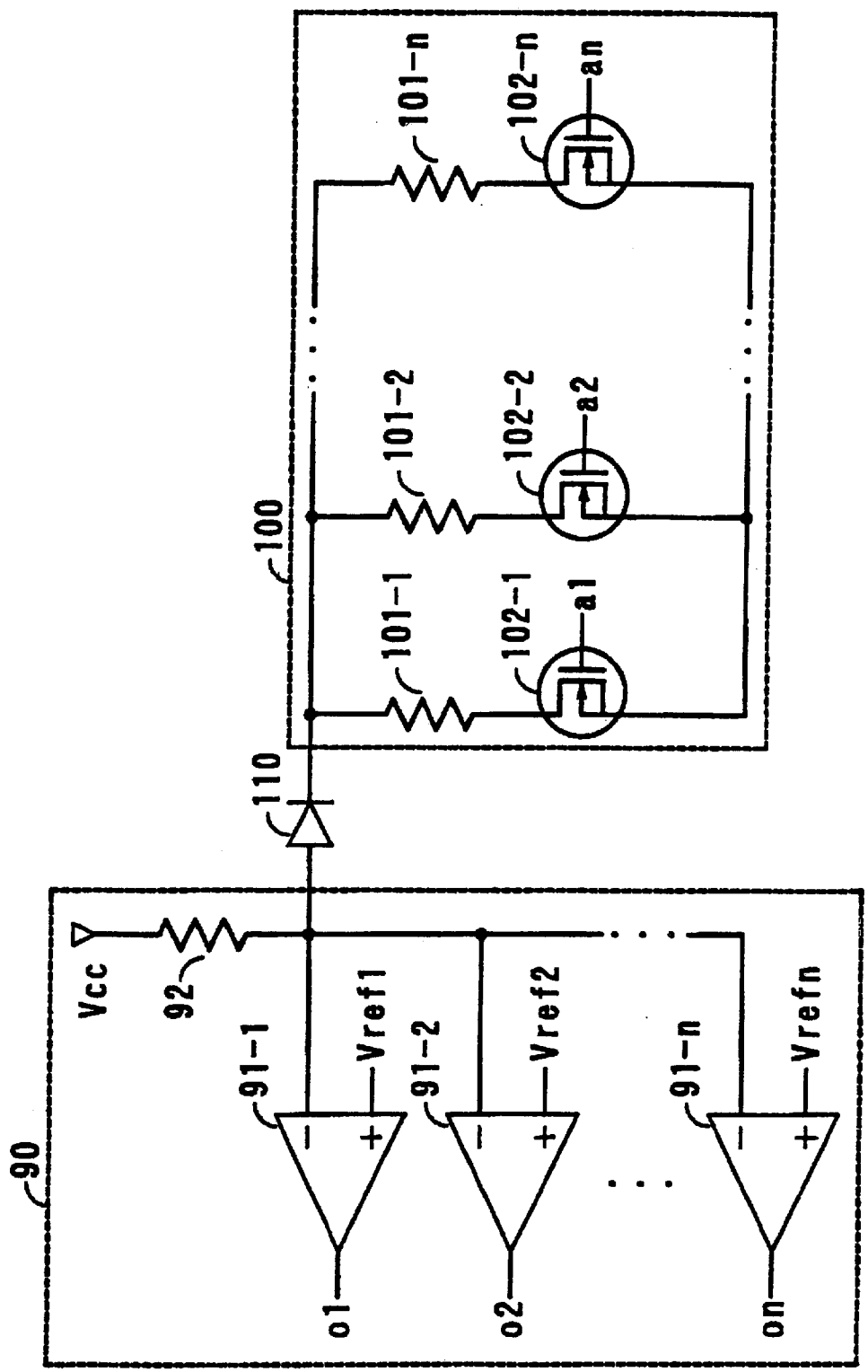
FIG. 4 shows a circuit showing the configuration for transmitting a multivalue signal from a high side to a control unit.

FIG. 4 shows an example of a configuration according to the third embodiment of the present invention. In the embodiment, the apparatus comprises a plurality of N-channel MOS type FETs 102-1 through 102-n and comparators 91-1 through 91-n to notify the control unit 30 of multivalue information from the drive circuits 11 through 13 on the high side. An I/F 90 corresponds to the portion for transmitting an alarm signal of the I/F 60, and the I/F 90 corresponds to the portion for transmitting an alarm signal of the I/F 50.

The I/F 90 comprises the comparators 91-1 through 91-n and a resistor 92. The inverted input terminals of the comparators 91-1 through 91-n are connected to a terminal of the resistor 92 and an anode of a diode 110. Reference voltages Vref1 through Vrefn are respectively input to the non-inverted input terminals of the comparators 91-1 through 91-n. The output signals from the comparators 91-1 through 91-n are provided as alarm signals of through on for the control unit 30.

An I/F 100 comprises serially connected resistors 101-1 through 101-n respectively connected parallel to serially connected N-channel MOS type FETs 102-1 through 102-n. The N-channel MOS type FETs 102-1 through 102-n are set in the ON state in order sequentially from the N-channel MOS type FET 102-1 to 102-n, and set in the OFF state in order sequentially from the N-channel MOS type FET 102-n to 102-1.

Described below are the operations described in the above mentioned embodiments.

Assuming that the status of the information to be transmitted has been changed, and the signal al input to the N-channel MOS type FET 102-1 indicates the H state, the N-channel MOS type FET 102-1 enters the ON state.

In the state, when the voltage applied to the diode 110 indicates the normal bias state, the voltage Vcc of the power supply is divided by the resistor 92 and the resistor 101-1. Therefore, the potential on the anode side of the diode 110 becomes lower than the voltage Vcc of the power supply. At this time, the reference voltage Vref1 applied to the non-inverted input terminal of the comparator 91-1 is set based on the voltage on the anode side of the diode 110 when the N-channel MOS type FET 102-1 enters the ON state. As a result, the output signal o1 indicates the H state.

As a result, the control unit 30 detects that the output signal o1 indicates the H state, and performs a predetermined process.

When the N-channel MOS type FET 102-1 enters the ON state, and the diode 110 enters the normal bias state, the comparator 91-1 changes the output signal into the H state.

Similarly, when the N-channel MOS type FETs 102-3 through 102-n sequentially enter the ON state, the comparators 91-1 and 91-2 hold the outputs in the H state, and the comparators 91-3 through 91-n sequentially change the output signals into the H state in order from o3 to on.

When they are set in the OFF state, they are sequentially changed in order from the N-channel MOS type FET 102-n to 102-1. As a result, the outputs are sequentially changed into the L state in order from the output signal on to o1.

As described above, according to the third embodiment of the present invention, the I/F 90 and the I/F 100 are connected to each other using the diode 110. Therefore, the apparatus can be smaller and less costly as in the, previous embodiments, and can transmit multivalue information from the I/F 100 to the I/F 90.

Described below is the four embodiment of the present invention.

Figure 5:
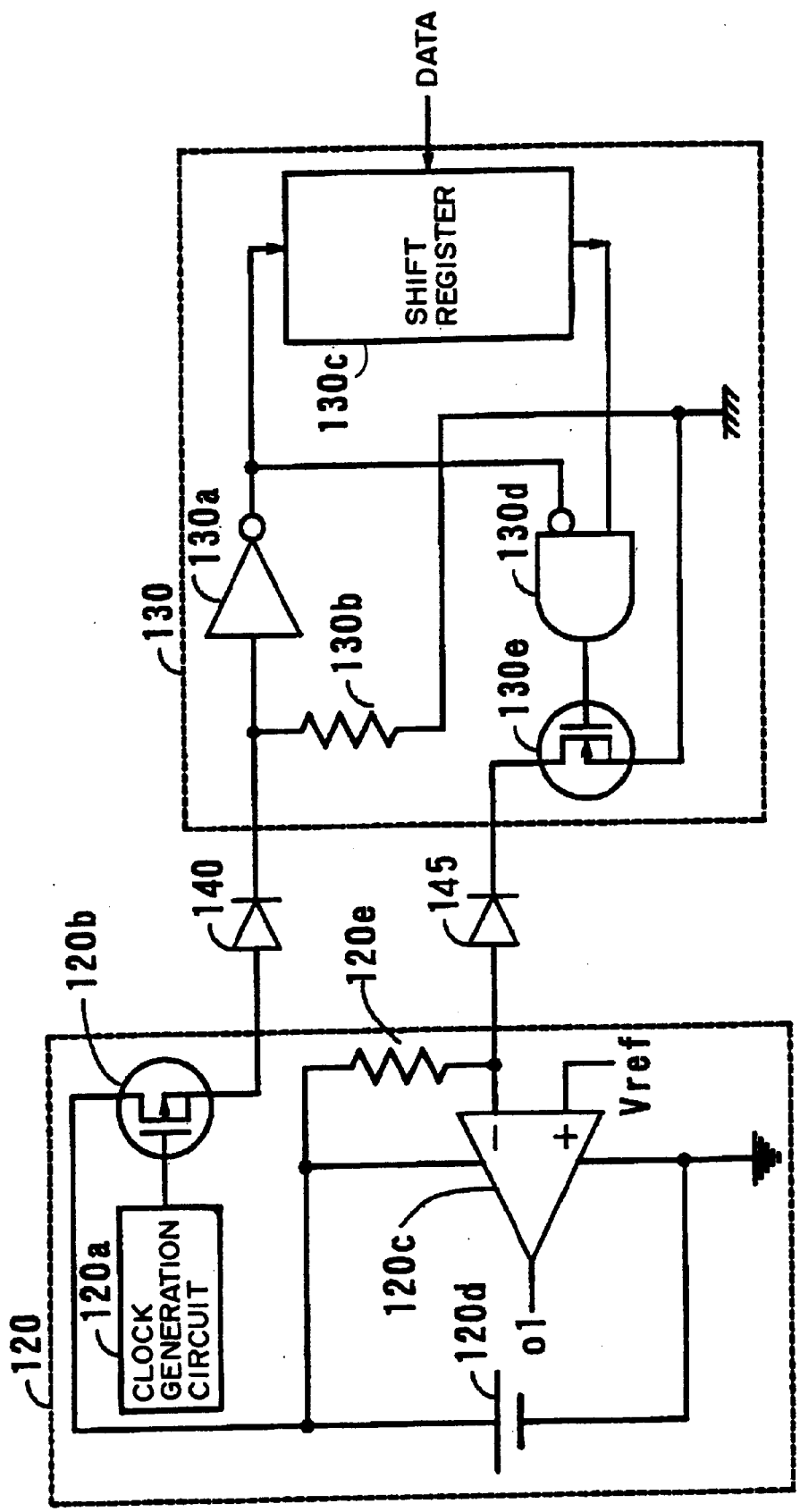
FIG. 5 shows a circuit showing the configuration for transmitting serial data from a high side to a control unit.

FIG. 5 shows the circuit as an example of a configuration according to the four embodiment of the present invention. In the embodiment, serial data can be transmitted from the drive circuits 11 through 13 on the high side to the control unit 30. An I/F 120 corresponds to the portion for transmitting an alarm signal of the I/F 50 shown in FIG. 2A, and an I/F 130 corresponds to the portion for transmitting an alarm signal of the I/F 60.

The I/F 130 comprises an inverter 130a, a resistor 130b, a shift register 130c, a logical product element 130d, and an N-channel MOS type FET 130e.

The I/F 120 comprises a clock generation circuit 120a (clock signal generation unit), a P-channel MOS type FET 120b, a comparator 120c, a power source 120d, and a resistor 120e.

The source of the P-channel MOS type FET 120b is connected to the input terminal of the inverter 130a through a diode 140. The inverted input terminal of the comparator 120c is connected to the drain of the N-channel MOS type FET 130e through a diode 145.

The clock generation circuit 120a generates a clock signal on a predetermined cycle, and provides it for the gate of the P-channel MOS type FET 120b. The P-channel MOS type FET 120b repeatedly enters the ON or OFF state according to the clock signal.

The comparator 120c compares the voltage of the resistor 120e changing depending on the ON or OFF state of the N-channel MOS type FET 130e with the reference voltage Vref, and sets the output in the H or L state depending on the comparison result.

The plus terminal of the power source 120d is connected to the comparator 120c, the resistor 120e, and the drain of the P-channel MOS type FET 120b, and the minus terminal is connected to the comparator 120c and the reference voltage portion.

The inverter 130a is connected to the cathode of the diode 140 and one terminal of the resistor 130b. The shift register 130c receives power supply monitor unit 11a or the serial data provided from the abnormal condition detection unit 11b, and provides it bit by bit for the logical product element 130d in synchronization with the clock signal output from the inverter 130a.

When the clock signal provided from the inverter 130a indicates the L state, the logical product element 130d sets the N-channel MOS type FET 130e in the ON or OFF state depending on the serial data provided from the shift register 130c.

The drain of the N-channel MOS type FET 130e is connected to the cathode of the diode 145, and transmits the information provided for the gate from the shift register 130c to the I/F 120.

Described below are the operations according to the above mentioned embodiments.

Assuming that the reference potential of the I/F 120 approaches the I/F 130, and both diodes 140 and 145 enter the normal bias state, information can be transmitted between the I/F 120 and the I/F 130.

Since the P-channel MOS type FET 120b repeatedly enters the ON/OFF state according to the clock signal provided from the clock generation circuit 120a, a voltage is applied to the resistor 130b according to the clock signal.

The inverter 130a inverts the voltage applied to the resistor 130b, and provides it for the shift register 130c.

The, shift register 130c provides the data provided from the power supply monitor unit 11a or the abnormal condition detection unit 11b for the logical product element 130d in synchronization with the clock signal provided from the inverter 130a. Assuming that data indicating the temperature of the semiconductor switch Q11 is input from the abnormal condition detection unit 11b, the shift register 130c provides the data for the logical product element 130d bit by bit in synchronization with the clock signal provided from the inverter 130a.

When the clock signal provided from the inverter 130a indicates the L state, the logical product element 130d receives bit data provided from the shift register 130c, and sets the N-channel MOS type FET 130e in the ON or OFF state depending on the state of the bit data provided from the shift register 130c.

As a result, since a voltage arises depending on the ON/OFF state of the N-channel MOS type FET 130e the resistor 120e, the voltage of the inverted input terminal of the comparator 120c changes depending on the data.

The comparator 120c compares the signal input to the inverted input terminal with the reference voltage Vref, sets the output in the H state when the input signal is lower than the reference voltage Vref, and sets the output in the L state when the input signal exceeds the reference voltage Vref.

Since the data output from the comparator 120c is provided for the control unit 30, the control unit 30 refers to the data and performs various controlling processes.

According to the above mentioned embodiments, serial data can be transmitted from the high side to the control unit 30.

Figure 6:
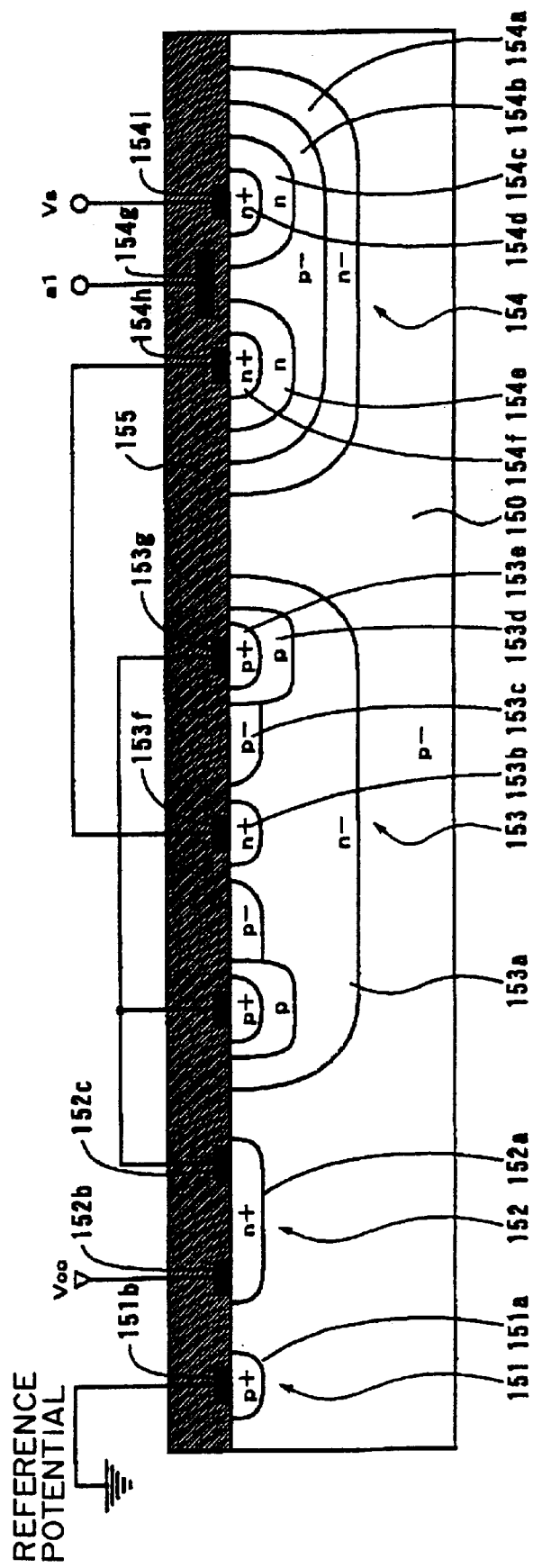
FIG. 6 is a sectional view of a resistor 50c, a diode 70, and an N-channel MOS type FET 60a designed on a semiconductor substrate.

FIG. 6 is a sectional views of the resistor and the diode on the low side, and the N-channel MOS type FET, shown in FIGS. 2B through 5, on the high side mounted on a semiconductor substrate. In FIG. 6, the embodiment shown in FIG. 2B is described as an example.

A semiconductor substrate 150 comprises a p-type semiconductor. A p+ area 151a is located at the leftmost portion of the semiconductor substrate 150 provided with a terminal 151b for connection to the reference potential.

An area 152 on the right to the p+ area 151a corresponds to the resistor 50c, and comprises an n+ area 152a on which terminals 152b and 152c are arranged at a predetermined interval.

An area 153 on the right of the area 152 corresponds to the diode 70. The area 153 comprises an n− area 153a which is the outermost area in the area 153, an n+ area 153b at the center, a p− area 153c which is a circular area around the n+ area 153b, a p area 153d which is also a circular area around the p− area 153c, and a p+ area 153e which is a circular area contained in the p area 153d. Terminals 153g and 153f are arranged on the n+ area 153b.

An area 154 on the right of the area 153 corresponds to the N-channel MOS type FET 60a. The area 154 comprises an outermost n− area 154a, a p− area 154b inside the n− area 154a, two n areas 154c and 154e contained in the p− area 154b, and n+ areas 154d and 154f respectively contained in the n areas 154c and 154e. Above the plane to which the p− area 154b and the areas 154c and 154e are attached, a terminal 154g corresponding to the gate is arranged. In addition, above the n+ areas 154d and 154f, terminals 154i and 154h respectively corresponding to the source and the drain are arranged.

Furthermore, above the semiconductor substrate 150, an insulation film 155 of silicon oxide, etc. is formed.

With the above mentioned semiconductor device, the embodiments shown in FIGS. 2B through 5 can be easily configured.

Figure 7:
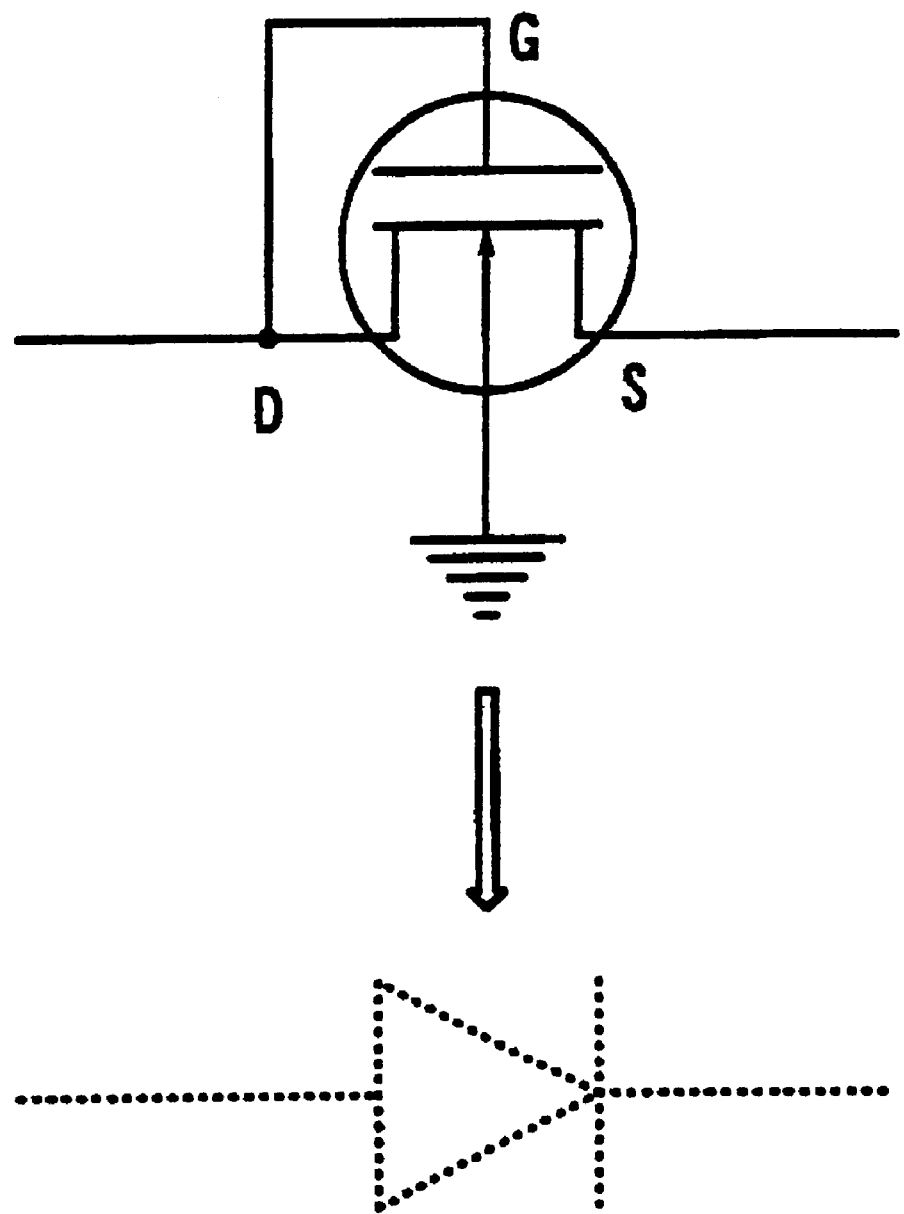
FIG. 7 shows an example of configuring a diode using an N-channel MOS type FET.

In the above mentioned embodiments, a normal diode having a PN junction is used. However, for example, a MOS type FET as shown in FIG. 7 can also be used. In the example shown in FIG. 7, the train and the gate of an N channel MOS type FET are connected, and a backgate is connected to a reference potential portion. Since this circuit is equivalent to a diode as shown by broken lines in FIG. 7, this type of circuit can be used for a diode. In this circuit, the backgate is connected to the reference potential portion, but can also be connected to the source.

According to the above mentioned embodiments, a direct current is converted into a three-phase alternating current by an electric power conversion apparatus, but the present invention is not limited to this application. That is, the present invention can be applied to an apparatus which is to transmit information from a high side in which a reference voltage is not constant to a low side in which a reference voltage is constant.

As described above, the present invention provides an electric power conversion apparatus comprising: a circuit on the low side for performing a switching operation based on the reference potential, and a circuit on the high side for performing a switching operation based on the floating reference potential which is different from the reference potential by a variable amount. With the configuration, the high side includes a detection unit for detecting the state of the operation of a circuit on the high side, and a signal generation unit for generating a signal based on a detection result of the detection unit. The low side includes a reception unit for receiving a signal generated by the signal generation unit, and a control unit for controlling the circuit on the low side or the high side corresponding to a signal received by the reception unit. The signal generation unit and the reception unit are connected to each other using a directional element with which the connection or disconnection state is determined based on the transmission direction of a signal. Therefore, the apparatus can be smaller and less costly.

What is claimed is:

1. An electric power conversion apparatus having a circuit on a low side for performing a switching operation based on reference potential, and a circuit on a high side for performing a switching operation based on floating reference potential which is different from the reference potential by a variable amount, comprising:

on the high side,
a detection unit detecting a state of an operation of the circuit on the high side; and
a signal generation unit generating a signal based on a detection result of said detection unit; and on the low side,
a reception unit receiving a signal generated by said signal generation unit; and
a control unit controlling the circuit on the low side or the high side corresponding to a signal received by said reception unit, in said signal generation unit and said reception unit are connected to each other using a directional element with which a connection or disconnection state is determined based on a transmission direction of a signal; and wherein said directional element is connected to a terminal for an output signal from said signal generation unit at the high side and to a terminal for an input signal to said reception unit at the low side, said directional element being connected in such a way to enable a current flow to be admitted through said directional element from said input terminal of said reception unit to said output terminal of said signal generation unit under a situation in which a floating reference potential is at a zero level.

2. The apparatus according to claim 1, wherein
said directional element is a diode whose cathode is connected to said signal generation unit, and whose anode is connected to said reception unit.

3. The apparatus according to claim 1, wherein
said directional element is a diode configured by a MOS type FET as an equivalent of a diode, a portion corresponding to a cathode is connected to said signal generation unit, and a portion corresponding to an anode is connected to said reception unit.

4. The apparatus according to claim 1, wherein
said signal generation unit generates a multivalue signal depending on a detection result of said detection unit; and
said reception unit receives the multivalue signal generated by said signal generation unit, and converts it into a corresponding signal.

5. The apparatus according to claim 1, wherein:
said low side further comprises a clock signal generation unit generating a clock signal;
said signal generation unit generates serial data in synchronism with the clock signal generated by said clock signal generation unit, and provides the data for the low side; and
said clock signal generation unit and said signal generation unit are connected using a directional element with which a connection or disconnection state is determined based on a transmission direction of a signal.

6. An electric power conversion apparatus having a circuit on a low side for performing a switching operation based on reference potential, and a circuit on a high side for performing a switching operation based on floating reference potential which is different from the reference potential by a variable amount, comprising:

on the high side,
detection means for detecting a state of an operation of the circuit on the high side; and
signal generation means for generating a signal based on a detection result of said detection means; and on the low side,
reception means for receiving a signal generated by said signal generation means; and
control means for controlling the circuit on the low side or the high side corresponding to a signal received by said reception means, wherein said signal generation means and said reception means are connected to each other using a directional element with which a connection or disconnection state is determined based on a transmission direction of a signal; and wherein said directional element is connected to a terminal for an output signal from said signal generation means at the high side and to a terminal for an input signal to said reception means at the low side, said directional element being connected in such a way to enable a current flow to be admitted through said directional element from said input tell of said reception means to said output terminal of said signal generation means under a situation in which a floating reference potential is at a zero level.

* * * * *